US012694695B2

(12) United States Patent
Goss et al.

(10) Patent No.: US 12,694,695 B2
(45) Date of Patent: Jul. 28, 2026

(54) MULTI-MODAL MEASURING DEVICE FOR SCHEMATIC GENERATION

(71) Applicant: BrightAl Corporation, San Francisco, CA (US)

(72) Inventors: Ryan James Goss, Prior Lake, MN (US); Graham David Ferris, Savage, MN (US); Mark Norgren, Savage, MN (US); Robert Parker, Hillsborough, CA (US); Daniel John Benjamin, Savage, MN (US); John Tafoya, Franklin, TN (US)

(73) Assignee: BrightAI Corporation, Palo Alto, CA (US)

( * ) Notice: Subject to any disclaimer, the term of this patent is extended or adjusted under 35 U.S.C. 154(b) by 301 days.

(21) Appl. No.: 18/405,185

(22) Filed: Jan. 5, 2024

(65) Prior Publication Data

US 2024/0233410 A1     Jul. 11, 2024

Related U.S. Application Data

(60) Provisional application No. 63/437,561, filed on Jan. 6, 2023.

(51) Int. Cl.
| | |
|---|---|
| *G06V 20/64* | (2022.01) |
| *G01S 17/86* | (2020.01) |
| *G01S 17/89* | (2020.01) |
| *G06V 10/147* | (2022.01) |
| *G06V 20/05* | (2022.01) |
| *G06V 20/20* | (2022.01) |

(52) U.S. Cl.
CPC ............ *G06V 20/647* (2022.01); *G01S 17/86* (2020.01); *G01S 17/89* (2013.01); *G06V*

*10/147* (2022.01); *G06V 20/05* (2022.01); *G06V 20/20* (2022.01); *G06V 2201/12* (2022.01)

(58) Field of Classification Search
CPC .... G06V 20/647; G06V 10/147; G06V 20/05; G06V 20/20; G06V 2201/12; G01S 17/86; G01S 17/89
See application file for complete search history.

(56) References Cited

U.S. PATENT DOCUMENTS

| | | |
|---|---|---|
| 10,627,512 B1 | 4/2020 | Hicks |
| 11,049,267 B2 | 6/2021 | Selviah et al. |
| 11,501,492 B1 | 11/2022 | Li et al. |
| (Continued) | | |

OTHER PUBLICATIONS

PCT International Search Report and Written Opinion, mailed Apr. 18, 2024, issued during the prosecution of corresponding PCT International Patent Application No. PCT/US24/10464; 10 pages.

(Continued)

*Primary Examiner* — Christopher Wait
(74) *Attorney, Agent, or Firm* — Shumaker & Sieffert, P.A.

(57) ABSTRACT

An improved measuring device has been developed by combining a visual detector such as a camera, digital distance measuring device, and a positional sensor. The system uses positional measurements of the device along with distance measurements to generate a point cloud and uses the visual image along with distance measurements to identify and label objects. The point cloud and labeled objects are combined to generate a schematic of the environment being measured and extract relevant measurements.

20 Claims, 18 Drawing Sheets

(56) References Cited

U.S. PATENT DOCUMENTS

| | | | |
|---|---|---|---|
| 11,714,193 B1 | 8/2023 | Foster et al. | |
| 12,412,288 B2 | 9/2025 | Wohlfeld et al. | |
| 2016/0314593 A1 | 10/2016 | Metzler et al. | |
| 2017/0123066 A1* | 5/2017 | Coddington | G01S 17/50 |
| 2017/0236299 A1* | 8/2017 | Valkenburg | G01S 17/87 |
| | | | 382/106 |
| 2018/0101934 A1 | 4/2018 | Cai et al. | |
| 2019/0298480 A1 | 10/2019 | Choudhry et al. | |
| 2019/0387216 A1* | 12/2019 | Hicks | G01S 17/10 |
| 2020/0043186 A1 | 2/2020 | Selviah et al. | |
| 2020/0408913 A1 | 12/2020 | Pompe et al. | |
| 2021/0157001 A1 | 5/2021 | Novel et al. | |
| 2024/0236242 A1 | 7/2024 | Goss et al. | |

OTHER PUBLICATIONS

International Preliminary Report on Patentability from International Application No. PCT/US2024/010464 dated Jan. 17, 2025, 3 pp.

* cited by examiner

POINTS
1 → 2    4.393 ft
2 → 3    3.373 ft
3 → 4    6.243 ft
4 → 1    4.409 ft
TOTAL: 4

MULTI-MODAL MEASURING DEVICE FOR SCHEMATIC GENERATION

RELATED APPLICATION

This application claims the benefit of Provisional Patent Application No. 63/437,561 filed on Jan. 6, 2023, entitled "Measuring Device and Method of Use."

BACKGROUND

Field of the Invention

This invention generally relates to a measuring device and more particularly to a digital measuring device that can be used in larger and outdoor spaces.

Description of Related Art

When measuring very large spaces people conventionally use tape measures and manually record readings onto paper. This requires two individuals to take the measurements. It can also result in less accurate measurements when measuring longer distances due to sag in the measurement tape.

Alternatively if a laser distance rangefinder is used, then the user needs to be able to stand at the starting point to measure and see the other end of the object/area to measure. Targeting the laser rangefinder to a particular location can be difficult over long distances, especially in bright conditions when it can be harder to see the laser beam hitting distant features and orientating it to hit a specific desired target. To help address this visibility problem with laser rangefinders, known retro reflector or other easily reflective devices can be used at the target. However, this would often require a second individual to maintain the retro reflector at the target location.

Regardless of whether a tape measure or laser rangefinder is used, the measurements are conventionally recorded manually when on-location and later manually entered into a digital computer aided drawing (CAD) or other digital system to create a digital representation of the space. Systems which digitize the measurements have precision problems when tracking large areas due to sensor drift, positional inaccuracy, or other issues.

As such, there still remains a need for an improved measuring device and system that can improve measurement accuracy when taking measurements of larger and outdoor features, that reduce processing time, can be easily used by a single individual, and reduce errors and incomplete information by automatically entering and digitizing the information in real or near real time.

BRIEF DESCRIPTION OF THE INVENTION

An improved measuring device has been developed by combining a visual detector such as a camera, digital distance measuring device, and a positional sensor. The system uses positional measurements of the device along with distance measurements to generate a point cloud and uses the visual image along with distance measurements to identify and label objects. The point cloud and labeled objects are combined to generate a schematic of the environment being measured and extract relevant measurements.

In an alternate embodiment, the data from a visual detector such as a camera, digital distance measuring device, and a positional sensor can be aggregated to allow the system to create a real time or semi real time augmented reality (AR) overlay that allows improved targeting of a measurement device.

BRIEF DESCRIPTION OF FIGURES

For a more complete understanding of the present invention and for further advantages thereof, reference is now made to the following description taken in conjunction with the accompanying drawings in which.

DESCRIPTION OF THE PREFERRED EMBODIMENTS

The present invention can be better understood by the following discussion of the manufacture and use of certain preferred embodiments. Preferably, the physical characteristics of the device are such that a single person can easily move this around within an outdoor environment. The device will typically be placed onto a tripod for a rigid and solid fixed position, but the invention can be hand-held for mobile operation. Typically the device will be a single self-contained unit, but the discrete components may be physically separated with an inter-communication network between the sensing systems and the processing units.

Figure 1:
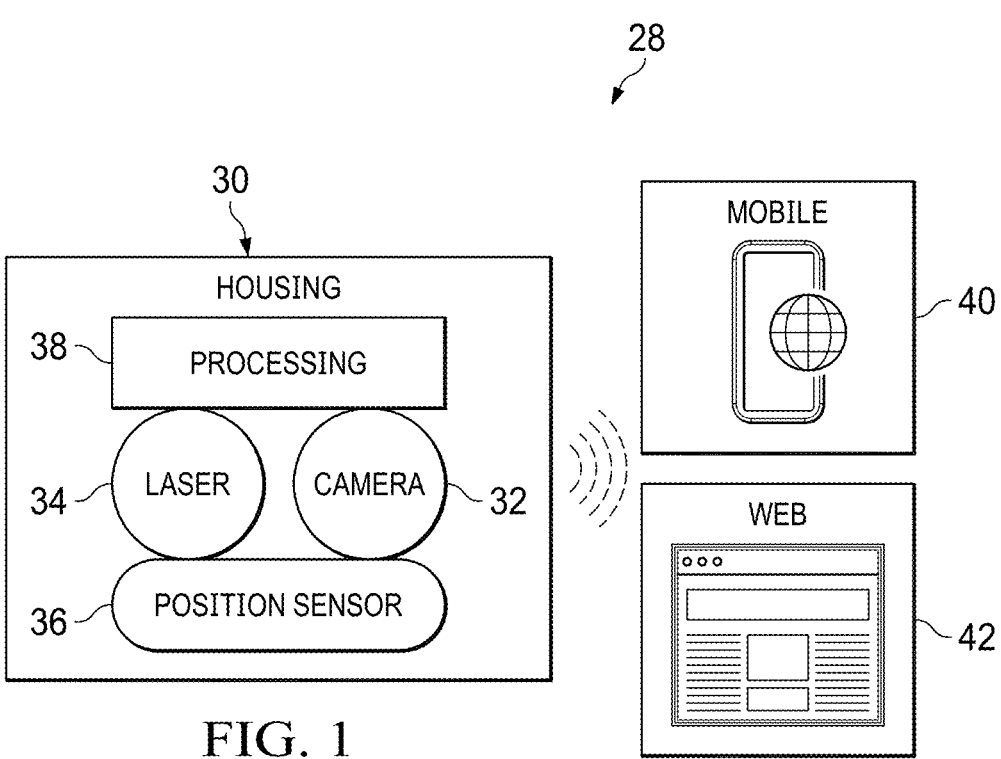
FIG. 1 is a schematic of a preferred embodiment of the current invention showing the various components the measurement device.

As shown in FIG. 1, in a preferred embodiment 28, the measurement device 30 is composed of one or more visual capture devices 32, one or more distance measuring device 34, one or more positional sensor 36, a data processing engine 38, and a command and control application.

The visual capture devices are positioned to provide images of the measurement scene. The visual capture device can preferably be devices like an RGB camera or an IR camera. The visual images are input from one or more cameras and are processed by the data processing engine.

The distance measurement devices are positioned to provide distances to objects in the scene. The distance measuring device can preferably be a LiDAR, laser or ultrasonic device. The distance information is input in the data processing engine and combined with other sensor inputs to provide the relative and absolute position information.

The positional sensors are used to track and predict the location and orientation of the measurement device relative to the other objects in the scene. The positional sensor can preferably include encoders, local positioning device, inertial sensors (such as accelerometer or gyroscopes), or other sensors that measure in any and all of 6 degrees of freedom: up, down, left, right, forward and backward; and detection and reporting of angles of pitch, roll, and yaw.

The command and control application preferably is an application on a mobile device 40 or computer 42 which is connected electronically to the measurement device. There is an interface with the measurement device, which can be wirelessly such as WiFi or Bluetooth, a wired connection such as Ethernet or USB connection. The protocol of commands and responses will be through use of a communication application program interface (API).

The main data processing will be done within the device 30 in the field in real-time or semi-real time computation. The data processing will perform some example tasks including, but not limited to: noise filtering, object recognition, image segmentation, edge detection, and point cloud registration. The data processing will enable the calculation and display of measurement.

Scanning Process

Figure 2:
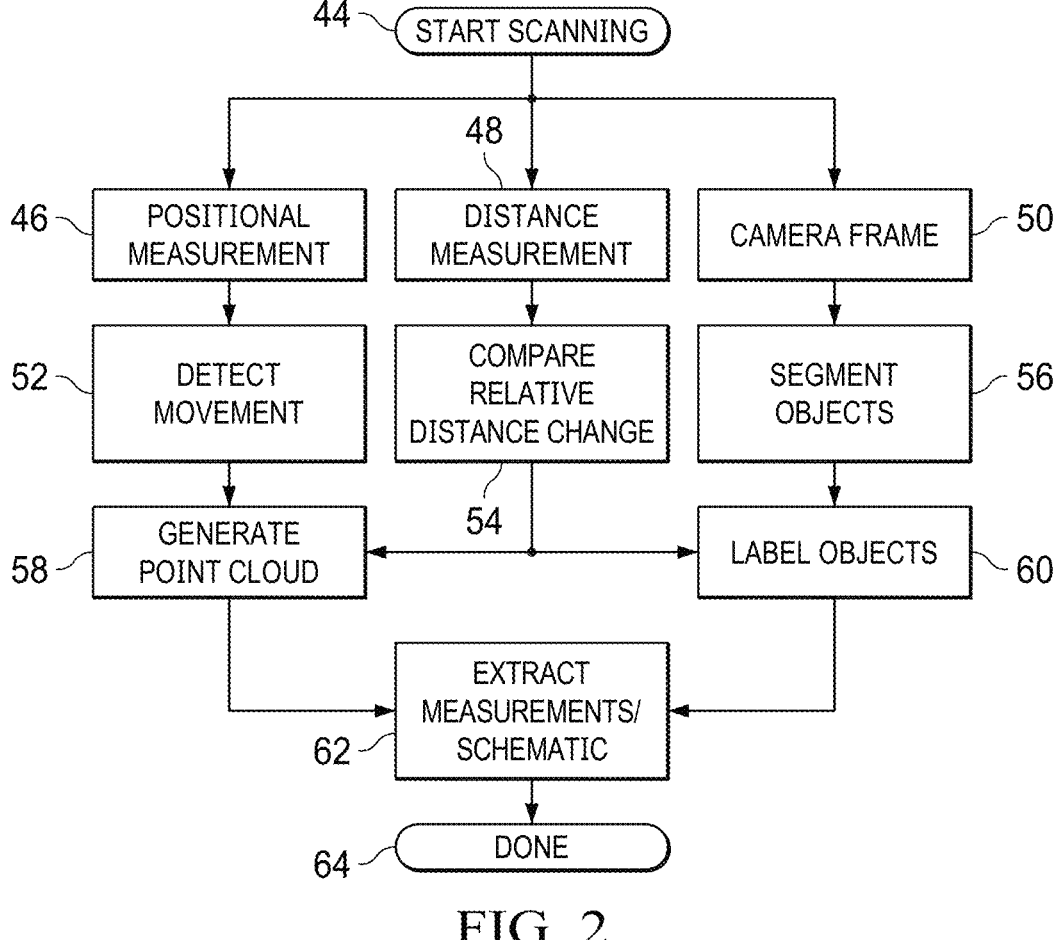
FIG. 2 is a flow chart showing the scanning process conducted by the preferred embodiment.

The overall scanning process is shown in the flowchart depicted in FIG. 2. When starting a measurement (step 44) all of the sensing systems will operate collectively to generate the desired measurements and output schematic drawings. The scanning process will be initiated with the application API and will trigger the device to begin ingesting sensor information. Each of the primary sensing systems will operate interactively to provide multi-modal sensing information to the processing unit on the device. Each sensor system will have corresponding drivers and data processing capabilities which can handle the specifics of that sensor system.

In general, once the scanning has been started (step 44), the visual capture device 32 will capture one or more images of the scene (step 50) and the image(s) are processed to segment the image to identify objects located therein (step 56). At the same time, the positional sensor 36 will take positional measurement of the sensor location and orientation (step 46). Also, the distance measuring device 34 will measure the relative distance change to the targeted object or location (step 54). Once all these measurements have been made, the data processing engine 38, either alone or in conjunction with a cloud-based system, will combine the data to form a point cloud (step 58) and to label the objects (step 60). This information is then used to extract the relevant measurements or schematics from the environment (step 62) before the scan is completed (step 64). As an example, the extracted measurements may be the shape and measurements of a pool located in a backyard so that a pool cover or liner of the proper size and shape can be manufactured.

Figure 5:
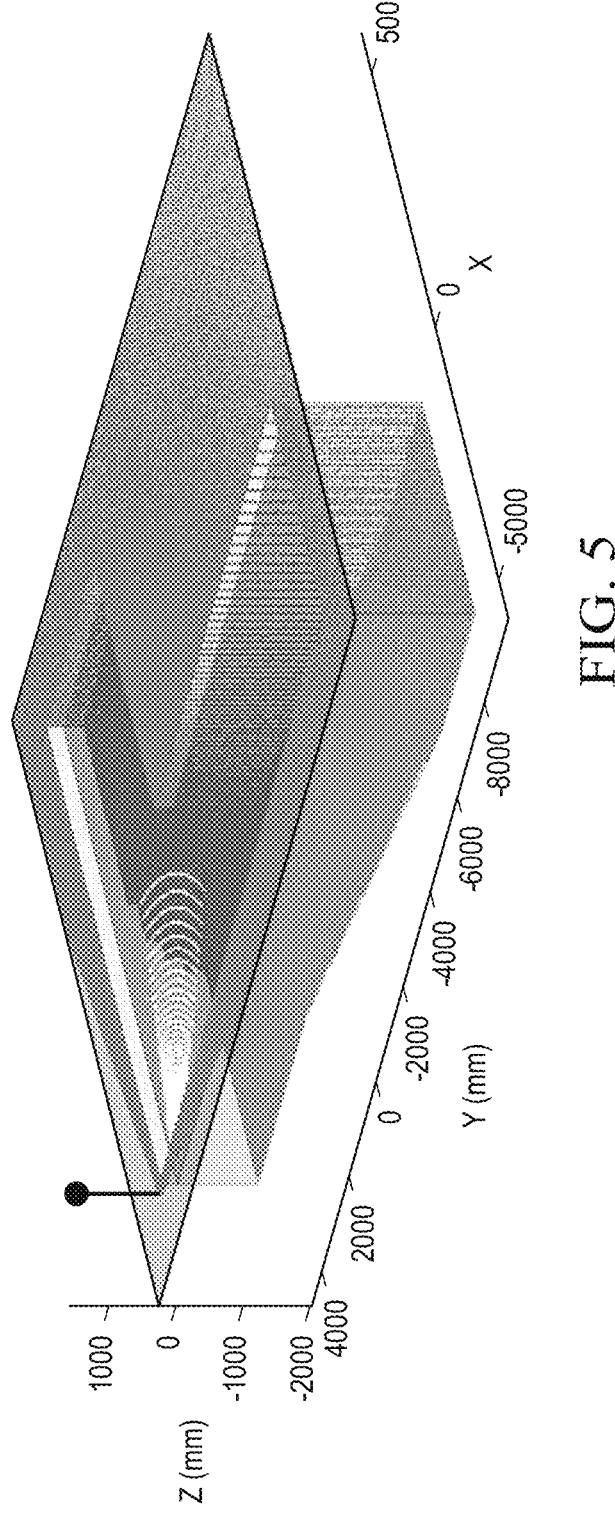
FIG. 5 is a point cloud generated by the preferred embodiment.
Figure 15:
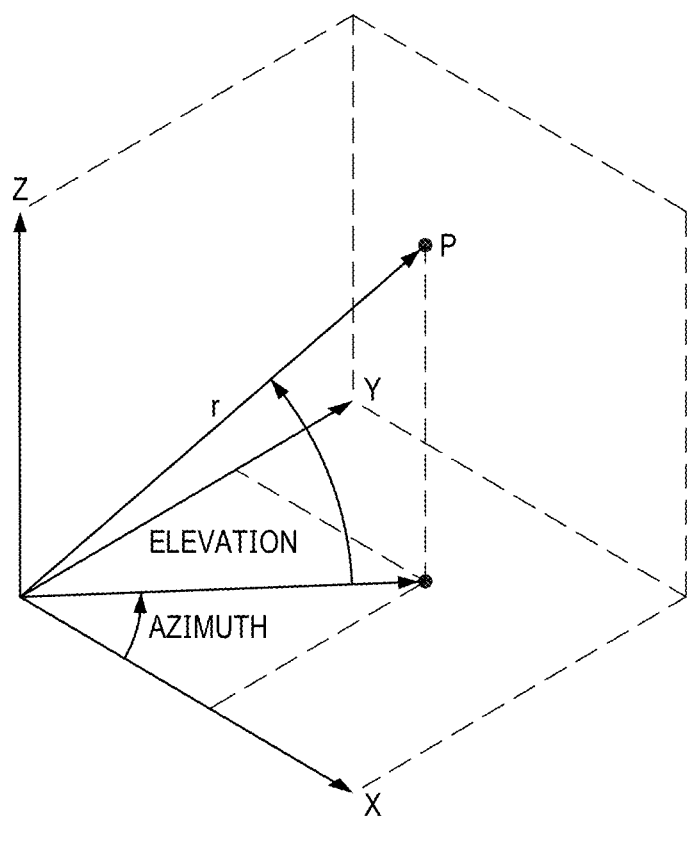
FIG. 15 is a diagram depicting how the location P is identified based on the elevation and azimuth of the sensor.

As shown in FIG. 15, preferably each measurement will consist of relative angles and distance from the measuring device. The combination of the positional information with the distance data is combined in the data processing engine so that the measured point 'P' is recorded by the measurement device in a common frame of reference. The frame of reference is the baseline orientation of the measurement device and preferably is arranged with the XYZ axis frames as shown in FIG. 5. The data processing system will further process the measurements to compute additional metrics including, but not limited to euclidean distance, length, width, height, surface area, and perimeter.

Figure 18:
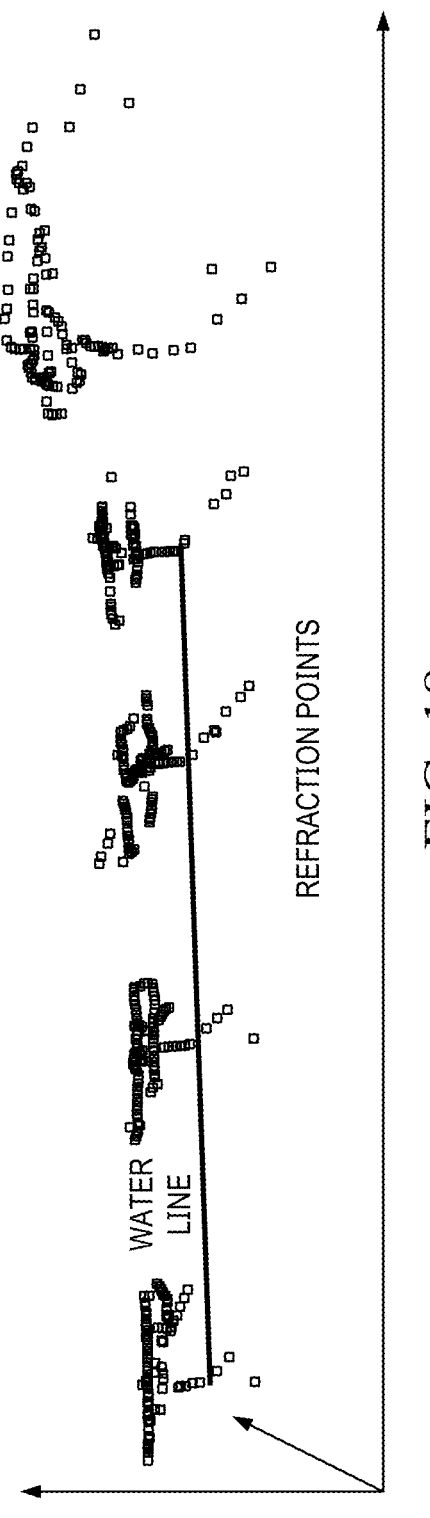
FIG. 18 is an uncorrected point cloud showing the effect of the water surface on the measured refraction points.
Figure 19:
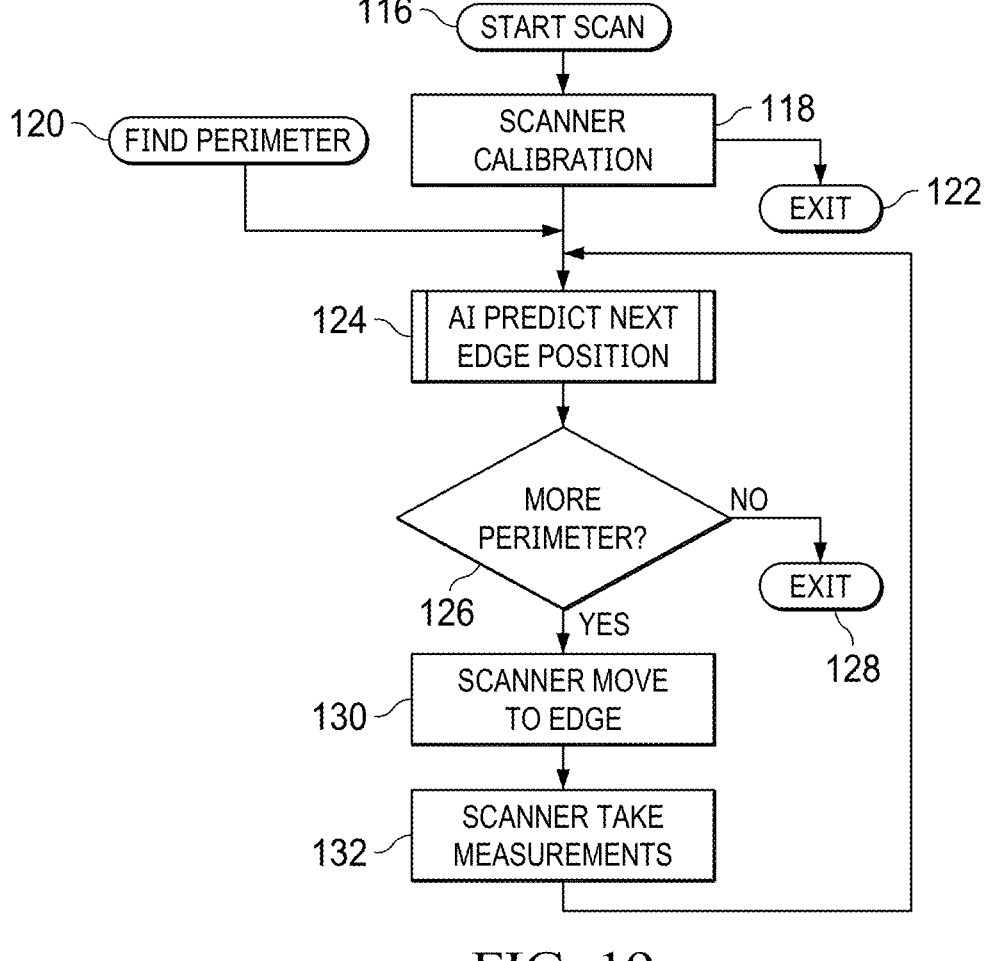
FIG. 19 is a flow chart showing the process used to determine the detection of the edges of a an object being measured.

A collection of one or more measurement points are combined by the software to generate a point cloud. An example of such a point cloud is shown in FIG. 18. The point cloud represents the position of each measurement in a common relative frame of reference. The data processing engine will process the point cloud for edge detection, water line detection and refraction correction.

Figure 21:
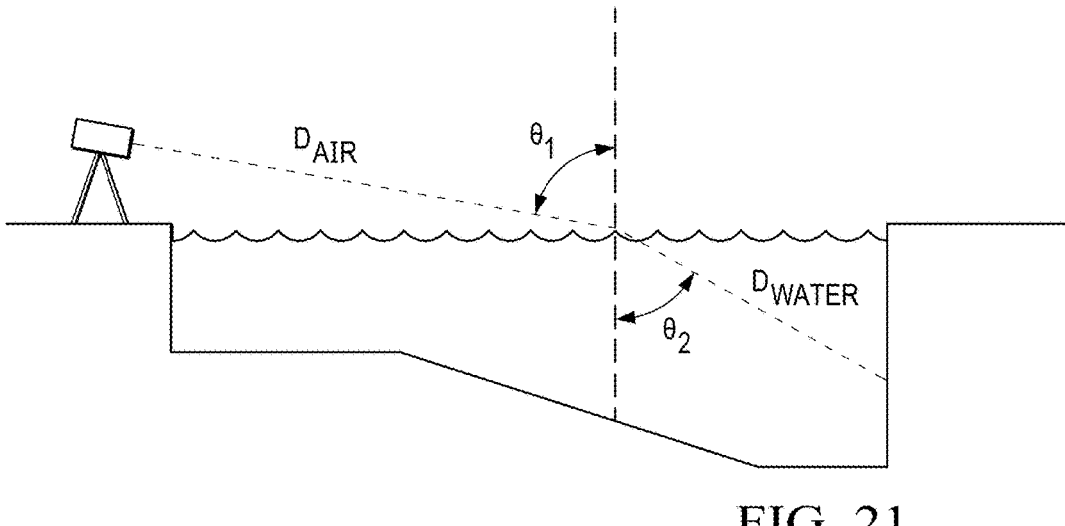
FIG. 21 is a cross sectional diagram showing the effect of the water surface on the diffraction angle of a laser measurement beam.

As shown in FIG. 21 the measurement device will measure some points through air while other points may be below water. The points below the water line must account for the refraction from the water which will include a change in the speed of light as well as the refraction angle, as shown by $\theta_1$ and $\theta_2$. The data processing engine will utilize the visual images from the cameras as well as the distance and position data in the point cloud to measure and predict the location of the water line. This can be accomplished using image segmentation and other visual processing to predict the contours of the pool as discussed below.

The location of the water line is considered to be a flat plane since the natural behavior of water is to settle flat. To detect and describe a plane for the water the measurement system will label a set of 3 or more points at the water line. The definition of the waterline is the top surface of the water that is the nominal level of the water relative to the measurement surface at the edge of the water.

As shown in FIG. 18 a point cloud with data below the waterline without correction will appear to be distorted. The measurement device will self-correct the refraction through calibration of the measurement scene. In a preferred embodiment this calibration will be detection of the water line by means of automatically measuring positions at the predicted water line and detecting the distortion error caused by the refraction and iteratively applying correction until the corrected data matches predicted non-distorted measurements. For example, the wall surface just above the water line is typically flat relative to the wall surface just below the water line. But with the refraction of the laser distance caused by the water the distances below the water line appear longer, so the wall appears to bend outward. That inflection point on what should be a flat wall is the predicted water line. By repeating this across many vertical lines around the pool a set of points is generated that can be mapped into a plane. Water is flat, so this water line plane should be in a flat plane. That physical phenomena can be leveraged to adjust the water line plane equation to the closest fit of all the predicted water line points. After refraction correction is applied the positions recorded by the measurement device will be recorded as if no water is present.

Figure 20:
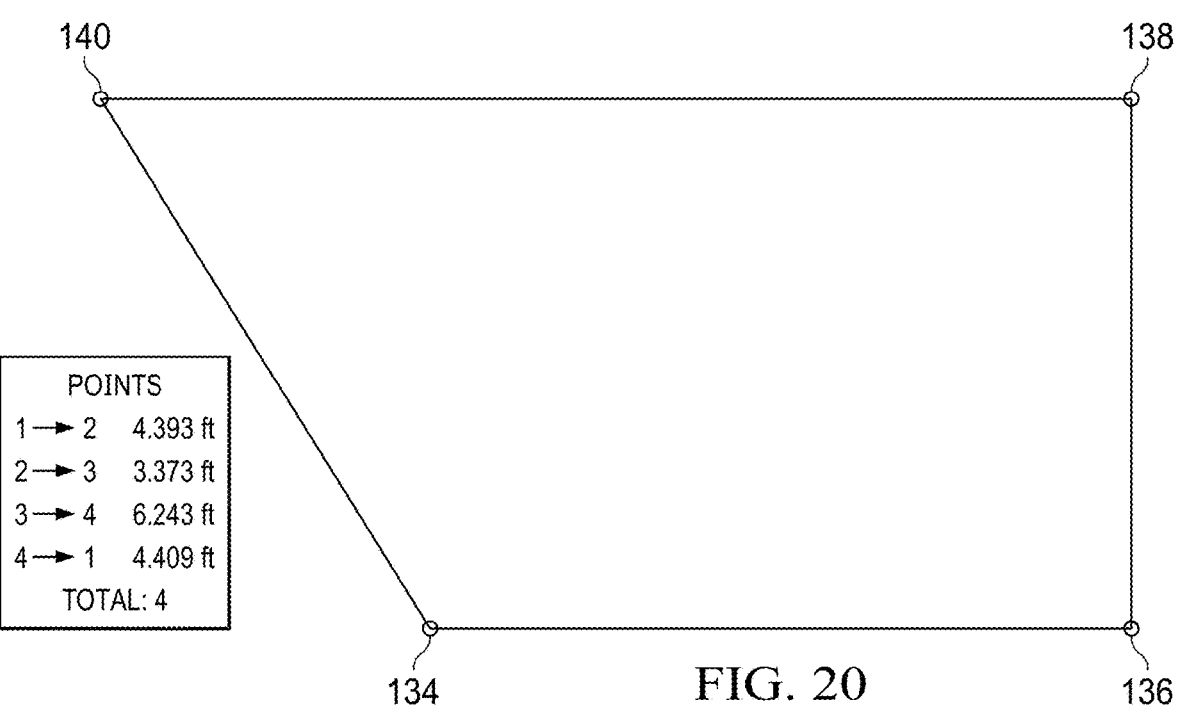
FIG. 20 is a diagram depicting the display of the measured points and reporting the euclidean distance between the reported points.

All of the measurement data and point clouds will be viewable by the user of the measurement device via the application interface. In a preferred embodiment, as shown in FIG. 20 the measured points will be displayed relative to each other with the euclidean distance between the points reported.

Figure 16:
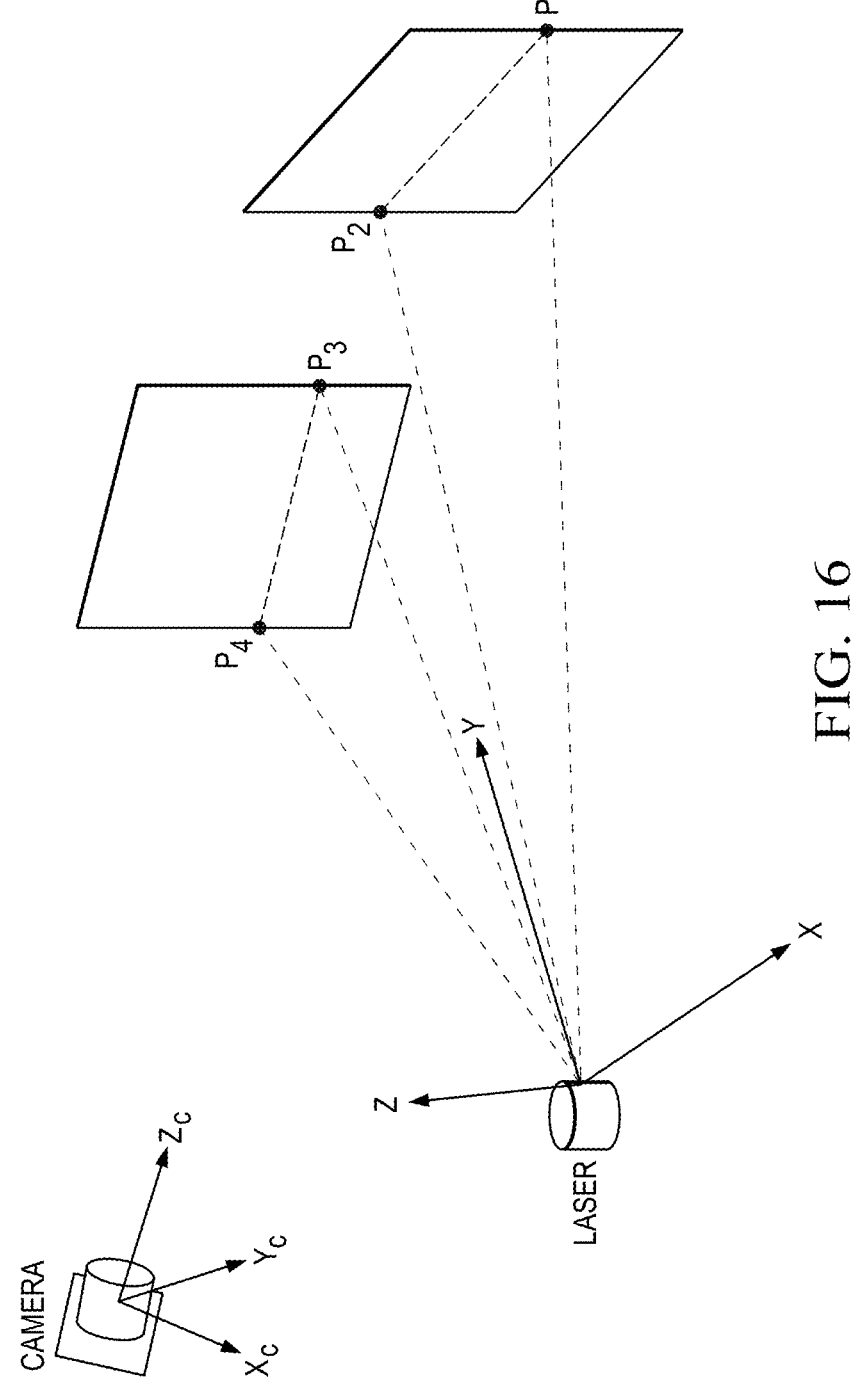
FIG. 16 is a diagram depicting the combination of information from the visual image with the distance measurement to identify and label objects.
Figure 17:
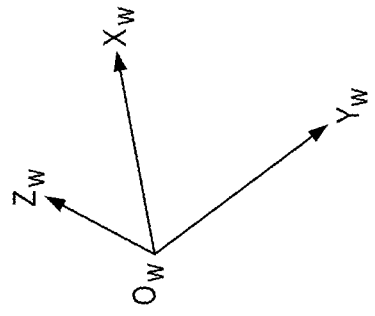
FIG. 17 is a diagram further depicting the combination of information from the visual image with the distance measurement to identify and label objects.
Figure 17:
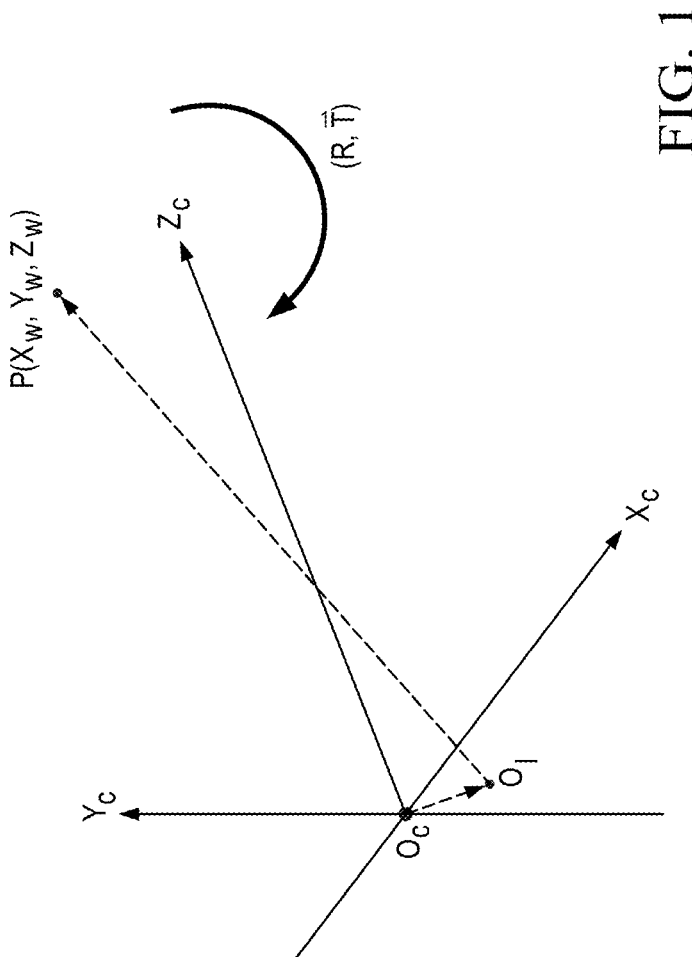

As shown in FIG. 16 the visual image from the camera is combined with the distance measurement to identify and label objects that are detected, such as the identification of the water line edges discussed above. Finally, the resulting point cloud and labeled objects are used to extract the measurements and generate the desired schematic. The relative positioning of the cameras provides for additional positioning information based upon the calibrated offset of the cameras and the other sensors. The images from the visual capture devices can be used to provide object detection and segmentation of the measurement scene. The camera systems provide a real-time view of the measurement environment, which can be used to operate the device from a different perspective.

Control

The control of the scanning system will be done with an application or website running on a mobile device or computer operated coresident with the scanning device. Typically this interface will be wireless (e.g. WiFi or bluetooth or other wireless communication protocols) for ease of connectivity, but it could be a wired connection (e.g. ethernet, USB) if higher bandwidth, lower latency, or more robust communication is required or the convenience of a wireless connection is not required.

The application preferably provides control over the measurement device as well as a live real-time view of the measurement operation. The live data representation includes seeing the current live measurements of distances, calculated measurements, and historical representation of previously marked positions.

The control can include simple Start/Stop functionality wherein the application tells the scanner to begin the measurement process, and the on-board processing unit and software perform an automatic scan of the environment. In this situation the Start operation may preferably provide environmental characteristics as to what is being scanned. Examples may be to distinguish between a swimming pool, patio, and decking to inform the scanning system regarding what is going to be scanned. Then the on-board algorithms will be trained to specifically detect each of the individual features, characteristics, and measurements in the scene. This also allows the scanning system to know which elements to consider as valid data or which ones may be noise to be discarded.

The controls can include manual or semi-automated control of the scanning system as well. This can include control over the movement, aiming and direction of the scanning process. The user being in the loop can then be used to provide assistance or guidance to where the scanner should move next.

The command and control application will allow for users to manually operate the measurement device without needing physical manipulation of the measurement device. This allows for touch screen controls, mouse movements and clicks, or keyboard entries to be passed from the application to the measurement device for remote control operations.

The scanning process can be augmented by the on-board processing of the scanner to result in precise and accurate measurements. The scanner will use a feedback loop from the on-board processed data to the user so that the user can be informed as to what the scanning system detects and measures within the scene. Then the user can use this information to provide further assistance or control of the scanning system and process. This can include, but not limited to: presenting information on detected objects and asking for confirmation on semantic labeling, presentation of measured distances and draft schematics for confirmation on possible noise and outlier detection, or final review of the measurements for precision, accuracy and completeness.

The live data representation includes seeing the current live measurements of distances, calculated measurements, and historical representation of previously marked positions.

Position

Figure 3:
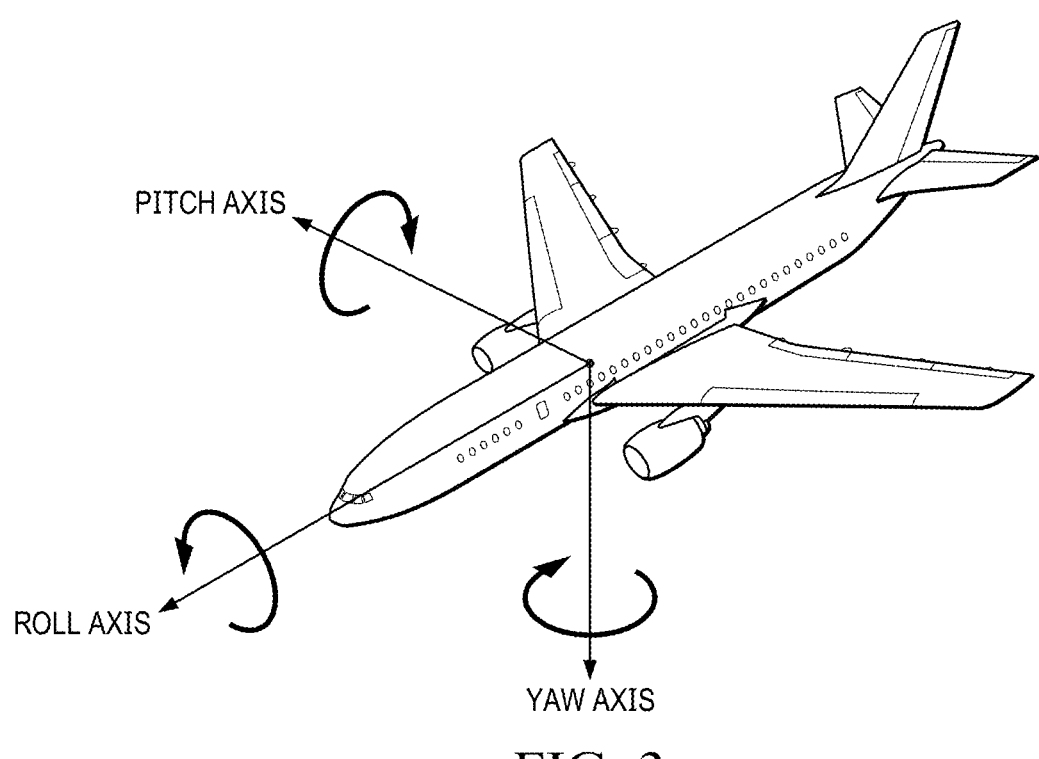
FIG. 3 is representation of an airplane depicting the three degrees of freedom used in the preferred embodiment.

For positional sensing we can sense movement in a variety of ways. For a fixed position (e.g. on a tripod) there will be motors or other movement controls which will change where the scanner is aiming. The typical degrees of rotation freedom are Pitch, Roll and Yaw. These degrees of rotation are depicted in FIG. 3. Any subset of these degrees of freedom can be measured and tracked using encoders on the rotational axis to measure the amount of rotational movement (in degrees/radians) and then using this to compute relative positional information about the rest of the scanner.

Figure 4:
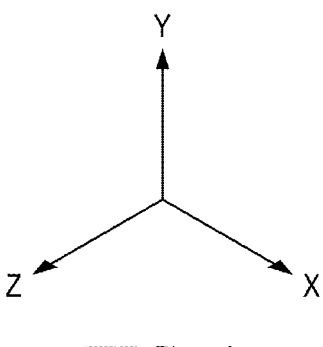
FIG. 4 is a representation of the Cartesian coordinate system used in the preferred embodiment.

If the device is mobile and rolling on a wheeled housing the encoders can also be used to detect relative positional movement, in the X, Y, and Z direction as depicted in FIG. 4. Additionally, an inertial measurement unit (IMU) may be used to sense these rotations. The IMU can also be used if the device is moved from a fixed position to detect motion in the XYZ directions. Another method to detect relative XYZ position is to use known placements and rely on RF or Ultrasonic localization using triangulation between the known points.

As the positional information is input into the data processing system the past and current positions are recorded and used to predict the future position, including the computation of a heading direction. The fusion of multiple positional sensors, previous position, predicted future position, computed heading can all be combined and compared against the current positional sensors to detect any anomalous or noisy readings. The anomaly detection will allow for detection of possible object detection within the environment, or may be used to detect and report a possible failure of the measurement device. In a preferred embodiment the positional information can include measuring the rotations of a motor, axle, or wheel with an encoder. The encoder operates by tracking the reporting of the change of rotation and reporting to the data processing engine. All other sensor information from the visual, distance and any other sensors is then adjusted based upon the computed position of the measurement device. This includes applying transformation and translation functions to adjust the relative location of the measurement device within the environment.

Distance

The distance measurements will be correlated with the positional system to update an overall point cloud which represents all of the measured points in a common XYZ frame of reference. FIG. 5 depicts a point cloud of a pool that was generated using the preferred embodiment.

In a preferred embodiment the distance measurements will result from the laser measurements and the data will be input in terms of time of flight of the light including possible modulations for amplitude, frequency, or phase to improve detection accuracy. The sampled data can be further processed to detect and account for motion of the measurement device within the scene based upon Doppler shift. In a preferred embodiment the optical system and distance processing software and hardware circuitry of the laser system will be calibrated and optimized for measurement distances in the range of 10 mm to 100 meters with a precision of approximately 1 mm error. Preferably when operating in exterior or brightly lit environments the laser system will use optical filters to block out ambient light sources. Additionally, data processing within the device will filter out noise and inaccurate distance measurements within the onboard processing system based upon the calibration and training of typical measured environments.

Visual

The visual system can utilize data segmentation to determine what and where to measure next. This can include automatically detecting and following the contour of a shape. This segmentation can be used to control or guide the placement and aim of the scanner to automatically measure the correct locations or augment the user to direct them where to guide or aim the scanner for the measurement process.

Figure 6B:
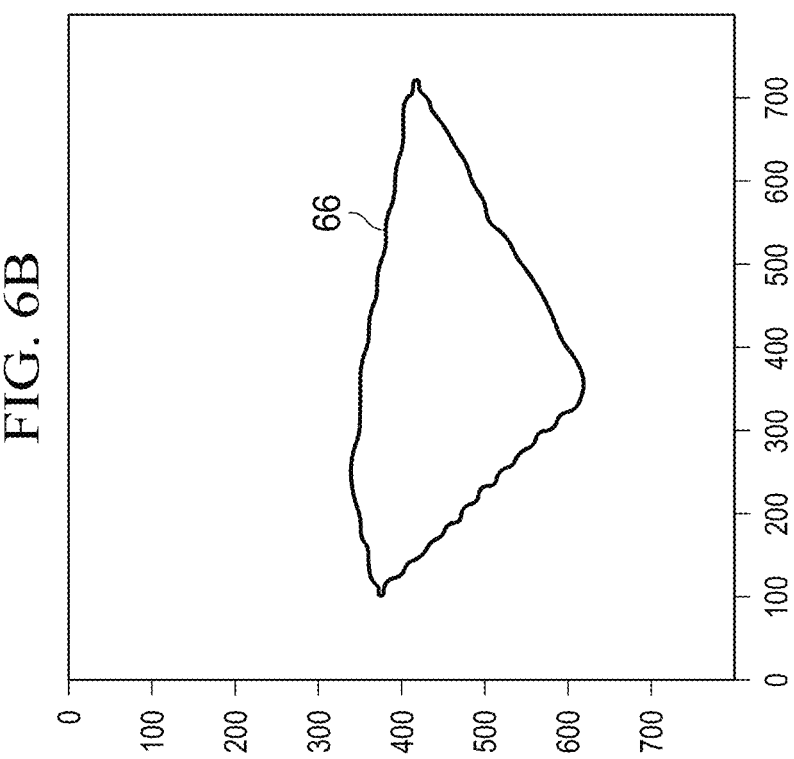
FIG. 6B is an extracted outline of the pool generated from the detected water portion in FIG. 6A.
Figure 6A:
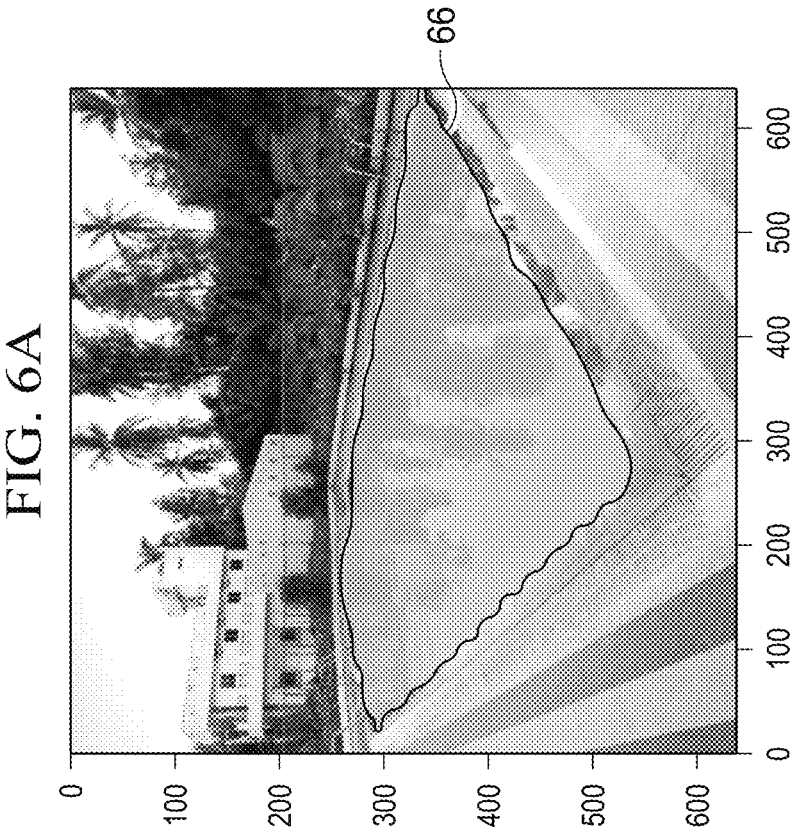
FIG. 6A is a depiction of a backyard with a pool showing the detection of the water portion of the interior of the pool.

FIG. 6A depicts an example of a visual image of a pool. The detection sees the water portion of the interior of the pool (inside contour 66) and extracts that contour 66 as shown in FIG. 6B based upon one or more of visual image processing, machine learning, and neural networks. The image processing will use edge detection to find the boundary between objects. The machine learning and neural networks will be trained on a set of training objects to detect and label. The continued operation and interaction with the user in the scene will also update the models used for detection.

Figure 7:
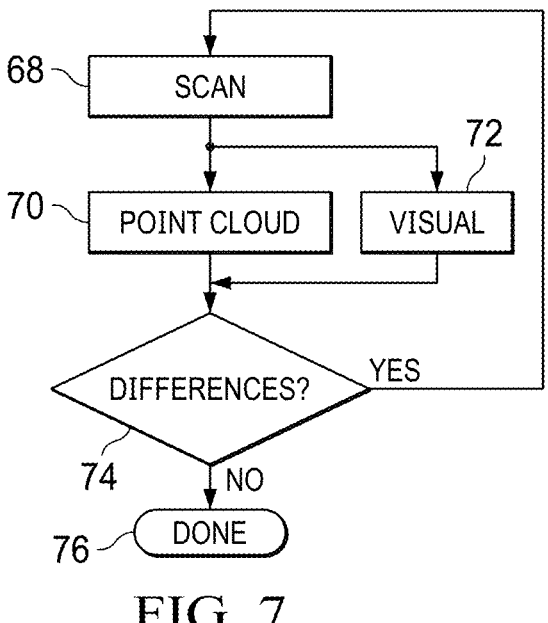
FIG. 7 is a flowchart depicting the steps used in the preferred embodiment in comparing the visual representation to the generated point cloud.

For higher accuracy, the visual segmentation can then be correlated with the point cloud data to check for any discrepancies between the two systems as depicted by the process shown in FIG. 7. Once a scan has been taken (step 68), the point cloud is generated (step 70) and the visual image is segmented (step 72). The data from these two steps are compared to determine any differences (step 74). If there are any differences the scanner can automatically continue to scan (going back to step 68), or notify the user regarding the need to continue scanning and denoting which areas are different.

The visual system will also be used for labeling critical points of interest in the environment. These may be many things in the scene including but not limited to:

Obstructions to note on the schematic

Points at which the height of an object should be captured

Rough or rugged areas that must be repaired

These labeled points can be added automatically based upon visual detection of different objects. These can be automatically labeled, or can be used to facilitate interaction with the user via the application. The user can see the list of label points and can Add, Edit or Remove points and images as they see the information of the environment.

Figure 8:
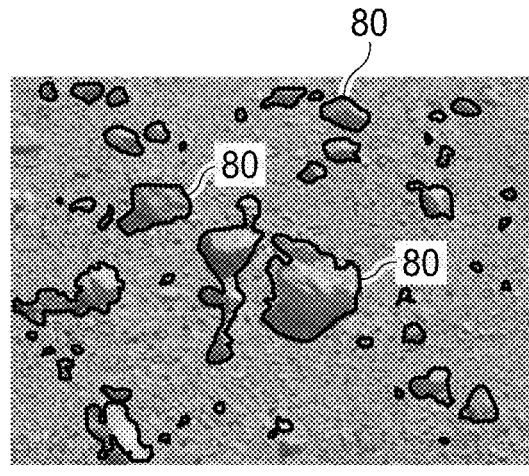
FIG. 8 is a photograph of the ground depicted the identification and outlining of the rocks and other raised areas in the field of view.

FIG. 8 depicts an example showing a photograph of rocks scattered on the ground. In this example the rocks and raised areas are marked in bounding boxes 80 to denote their location. The camera system can be calibrated to adjust for different environmental conditions, such as adjusting contrast and brightness. This can be done by using known fiducial (e.g. checkerboard) to detect the known parameters and adjust camera based upon environmental condition so the expected results match the actual.

The visual system will be calibrated with the distance measurements from the 3D point cloud to provide a mapping of the 2D visual image and the 3D point cloud data. This will allow for mapping of visual detection of objects identified using the visual system into 3D coordinates which can then be used to augment and combine with the distance measurements in the 3D point cloud. The visual system can map and correlate its 2D position with the 3D points that are detected. The visual system knows it's relative position and orientation within the common frame of reference. As the measurement device 10 moves about within the environment the new orientation and recorded distance can then apply the translations and rotations to the 2D image. Utilizing ray tracing and object tracking, the measurement device 10 can use the visual information to project the 2D images into 3D space, which can be used to augment the 3D position. The calibrated 3D to 2D mapping will allow for augmented overlays on the visual representation of the measurement environment to correlate with the relative positioning of the 3D position within the 2D visual image representation. Examples of the augmented 2D visual overlay may be where the current distance measurement is to allow the user to know the location which the measurement device is currently measuring. This will allow the user to have better than human sensing by viewing the augmented visual representation to take extremely accurate distance measurements within the environment.

Measurements/Schematics

The output data will be based on points of interest, measuring situation and environmental conditions to extract the measurements and/or schematic for usage in CAD software.

If points of interest are marked then the combination of the visual detection and point cloud data will provide the overall XYZ marking of any and all points of interest in the scene as well as a visual representation of that POI for someone to reference later.

Figure 9:
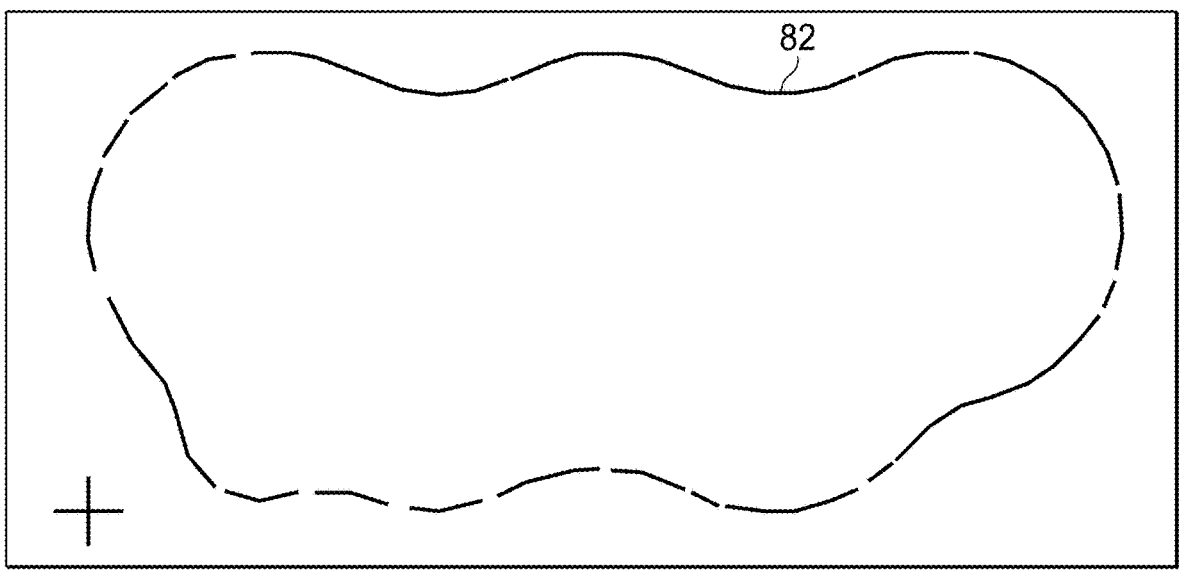
FIG. 9 is an outline of a pool generated using the preferred embodiment of the invention.

Different situations will perform different measurements. The device may be setup to measure the perimeter of a pool, in which it is known that the pool is effectively a hole with a nearly flat decking surface and the key measurements are the length and width as well as the overall outline. Different situations will denote different measurement techniques as well as different output measurements and schematics. As an example, FIG. 9 shows an outline of the parameter of a pool generated using the preferred embodiment of the invention.

Augmented Reality Overlay

In an alternate embodiment, the sensor inputs from the measuring tool's scanning system with cameras for visual, lasers (or other sensors) for distance, and positional sensors can be aggregated to provide insight and assistance to the measurement process in real-time or semi-real-time operation.

In order to know where the scanning system is measuring the system can present an augmented reality (AR) overlay or display of the current measuring position. When the measurement position is extremely far away the user will not be able to visibly see where the precise location of the measurement is. The AR display will allow for the application to present a live stream of the measurement position. The position information may also be presented in positional coordinates (e.g. XYZ) relative to the frame of reference. Either or both of these positional information systems may be used independently or in conjunction with each other.

Figure 10:
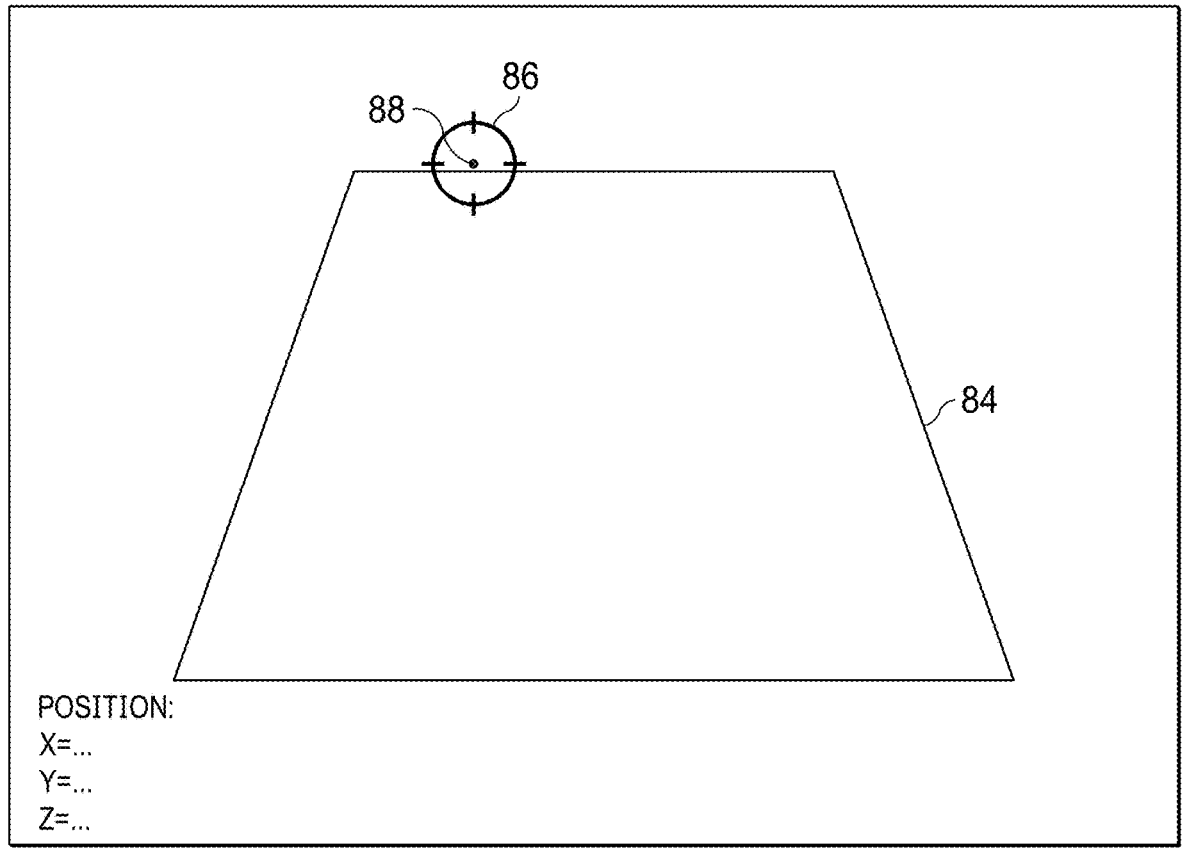
FIG. 10 is a depiction of a rectangular pool showing the augmented position overlay relative to the actual measurement position.

FIG. 10 depicts a case where an outdoor pool 84 is being measured. An AR target 86 is visually imposed onto the visual image of the pool to indicate the location of the laser or other beam that is carrying out the measurement. This allows the technician to properly target the measuring device at the desired target 88 to get an accurate measurement.

Figure 11:
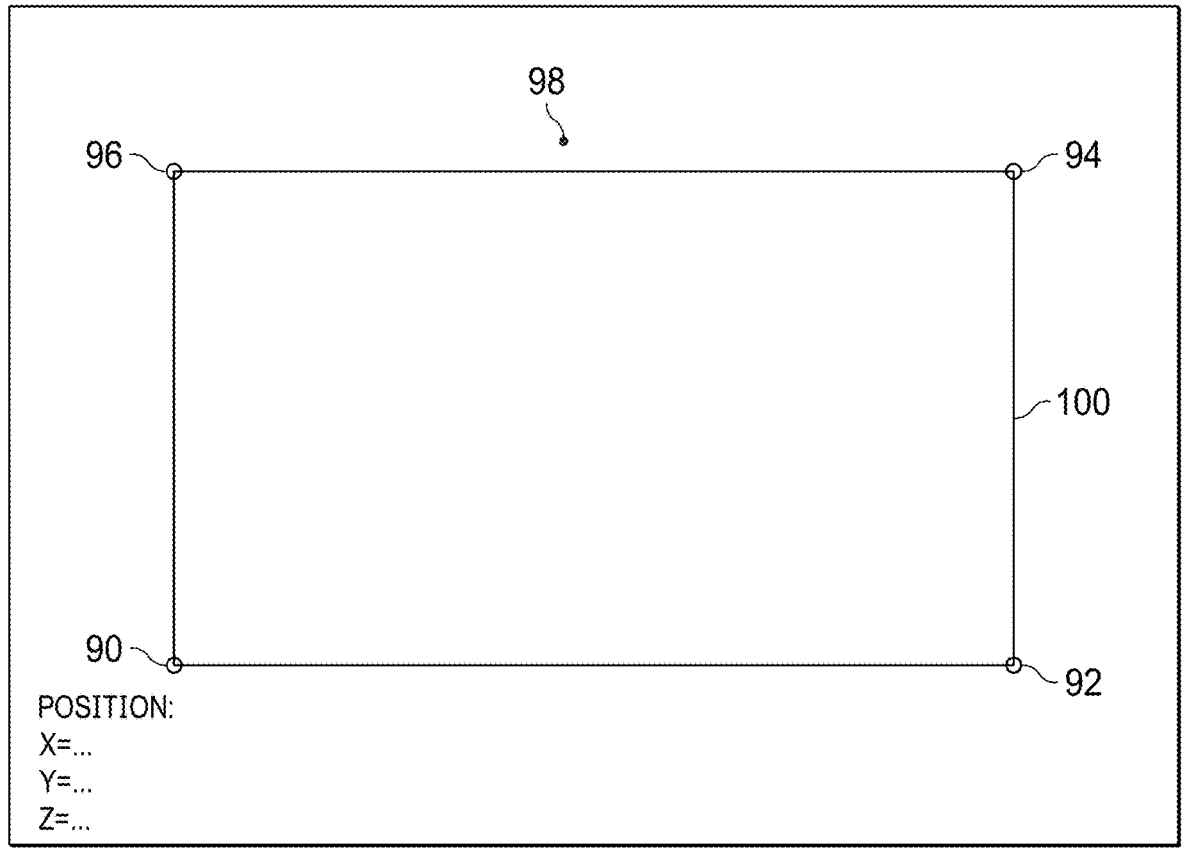
FIG. 11 is a depiction of an augmented display containing previously labeled points in addition to the current measurement position.

Another positional augmented display is shown in FIG. 11 that uses previously labeled points (90, 92, 94, and 96) in the scene of a pool 100. This allows for knowledge of where the current position 98 is relative to the other positions already measured (90, 92, 94, and 96). This display allows for easy detection of anomalies and outliers if the relative position representation does not match the actual scene positions.

Prediction

The visual system can utilize data segmentation, edge detection or other processing logic to break the image up into categories or other meaningful representations to determine what objects are in the scene and present this information on where to measure next to the user. This can be accomplished using techniques such as thresholding of color, intensity and/or contrast to determine the location or absence of certain objects or grouping on common color, contrasts or other metrics from the image. Alternatively, contour segmentation can be used based, where using the proximity of the pixels, only the outline of the thresholded pixels is labeled. This would act like a stencil to outline the object. Similarly, cluster segmentation can be used to group the pixels into discrete groups. A common example of this method is K-means clustering where after iteratively splitting and grouping the pixels you end up with K groups that have the most similarity based upon the metrics. Edge detection would use similar techniques to specifically find the end of one object and the start of another. The presentation to the operator would include on screen overlays which may be a bounding box, a contour outline, or other marking to draw the attention of the operator that this may be something to investigate further. The objects can be trained ahead of time based upon the expected measurement scene, or may be based upon fixed and known objects or fiducial markers, or may be trained based upon the user feedback. There are other object detection methods available, these are listed as some examples but not limited to the only options.

Figure 12:
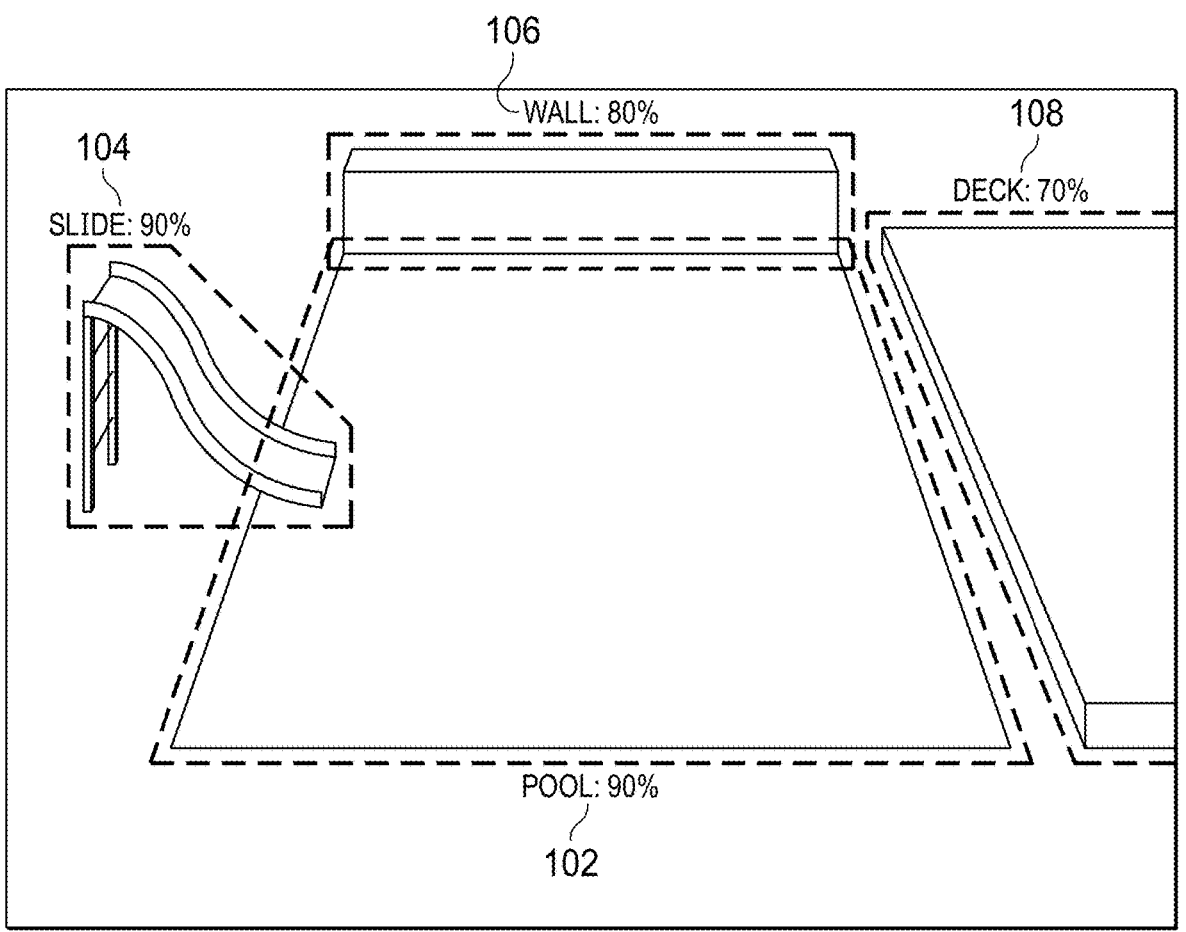
FIG. 12 is a depiction of a visual scene with the identified objects labeled along with confidence percentages for such identification.
Figure 13:
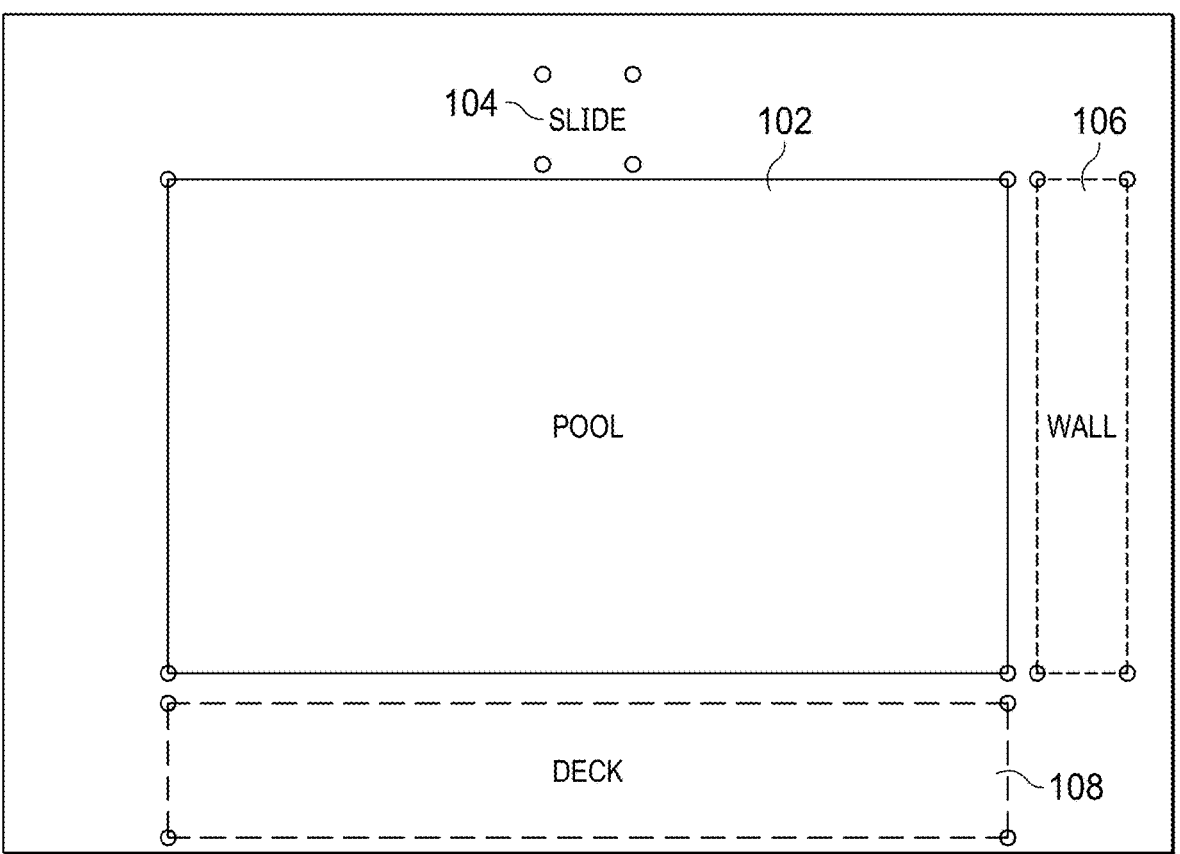
FIG. 13 is a relative position diagram generated from the labeled objects shown in FIG. 12.

In the example shown in FIG. 12 you can see the labeled objects, namely pool 102, slide 104, wall 106, and deck 108. The percentage confidence is shown and may be included or discarded depending on the desired usage. The user can now use the relative positions of the detected objects in the scene to control the measurements of the scanning system Steering and Control Controls can include touching on a specific object and moving the scanning system to measure that position, or selecting the object to add additional positions and labels. This information can also be presented in a diagram (e.g. XYZ) to show the labeled points associated with each detected object and the relative position between each of the objects. The user can then use this information to Add/Edit/Remove positions. This can include aiming the scanning system at an already targeted position, or selecting a different position for the same object and recording the association via the control interface FIG. 13 shows a relative position diagram generated from the labeled objects identified in FIG. 12. The relative position diagram will make visualizations of any outliers or missing information easy for the user to detect. In addition if there is an object the scanning system has detected and the points have not been labeled yet the scanning system and application can inform the user of these "To Be Labeled" items. The user can follow the previous examples in labeling the positions, or they can select to ignore or discard the detected objects. This allows the user to inform the scanning system that some item in the scene is not material to the measurement of this environment. This may be a moveable object that happens to be detected, or may be noise detected due to environmental conditions. Any ignored objects can then be used to update the future prediction logic so that similar scenes may automatically adjust to typically ignored objects Manual Control The scanning system may be controlled with a manual control mechanism. This can be a virtual or physical joystick or D-pad (up, down, left, right) or other similar control input device. The controls will be input via the application interface and will result in the corresponding movements from the scanning system. The user can utilize the position overlays, predicted objects and any other information about the scene to control the movement of the scanning system with the measured scene.

Automated Control

The scanning system can also be operated in autonomous or semi-autonomous mode. This would include where the user tells the scanning system to automatically label and measure all the detected objects in the scene. The user may select a subset of objects, or limit the range of movement the scanning system may make during this autonomous step. The automated steps may also include a review and edit stage for the user to adjust any possible inaccuracies in the data. Whenever an adjustment is made the scanning system can record the updated information to ensure improvements on future measurements.

Figure 14:
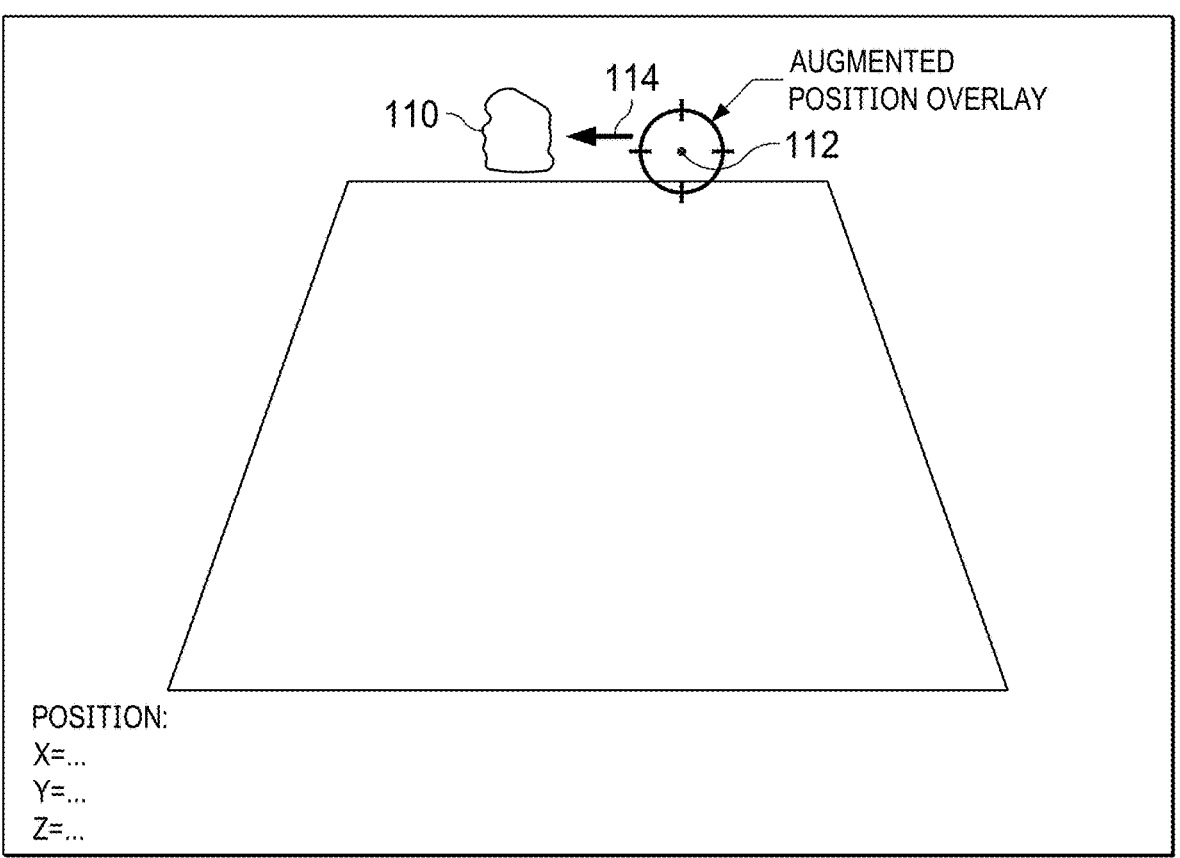
FIG. 14 is a depiction of a scene where the target marker is mobile and has been moved to a new location.

As shown in FIG. 14, the objects detected in the scene to automate the movement may be mobile as well. This can be used to allow the user to place this marker at different locations throughout the scene. As the user moves the marker they will tell the scanning system to again move or track the change of position to the selected object.

When the user selects a specific object 110, or labeled position, the scanning system will automatically compute the relative position from the current position 112 to the desired location of the selected object 110. Then the scanning system will adjust the movement 114 to result in placement of the measuring position 112 on the selected object 110 or labeled position.

The above descriptions of certain embodiments are made for the purpose of illustration only and are not intended to be limiting in any manner. Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is being claimed is:

1. A measuring device comprising:
   a visual sensor that generates visual data;
   a distance sensor that generates distance data;
   a positional sensor that generates positional data regarding the measuring device; and
   a processing unit, wherein the processing unit is programmed to:

combine the positional data and the distance data to generate a point cloud of an environment;

combine the visual data and the distance data to identify objects in the environment;

augment a portion of the distance data for apportionment of the environment; and combine the point cloud and the identified objects to create an output schematic.

2. The measuring device of claim 1, wherein the visual sensor is a camera.

3. The measuring device of claim 1, wherein the distance sensor is configured to perform laser distance measurement.

4. The measuring device of claim 1, wherein the measuring device is further configured to wirelessly communicate with a control application adapted for installation on a mobile device.

5. The measuring device of claim 1, wherein the processing unit is programmed to use data segmentation to identify the objects in the environment.

6. The measurement device of claim 1, wherein the processing unit is further programmed to compare the visual data to the point cloud of the environment to determine whether to perform one or more further scans.

7. The measurement device of claim 1, wherein the processing unit is further programmed to map the visual data onto the point cloud of the environment.

8. The measurement device of claim 1, wherein a portion of the environment is located below a water line, and wherein the augmentation compensates for a refraction of electromagnetic radiation through water.

9. The measurement device of claim 1, wherein, to augment the portion of the distance data for apportionment of the environment, the processing unit is programmed to define a plane of water indicated by the distance data.

10. The measurement device of claim 1, wherein, to augment the portion of the distance data for apportionment of the environment, the processing unit is programmed to apply a correction to one or more points of the point cloud to remove a distortion.

11. A method comprising:

generating, by a visual sensor of a measurement device, visual data;

generating, by a distance sensor of the measurement device, distance data;

generating, by a positional sensor of the measurement device, positional data regarding the measuring device;

combining, by a processing unit of the measurement device, the positional data and the distance data to generate a point cloud of an environment;

combining, by the processing unit, the visual data and the distance data to identify objects in the environment;

augmenting, by the processing unit, a portion of the distance data for apportionment of the environment; and combining, by the processing unit, the point cloud and identified objects to create an output schematic.

12. The method of claim 11, wherein the visual sensor is a camera.

13. The method of claim 11, wherein generating the distance data comprises performing laser distance measurement.

14. The method of claim 11, further comprising wirelessly communicating, by the measuring device, with a control application adapted for installation on a mobile device.

15. The method of claim 11, further comprising using, by the processing unit, data segmentation to identify the objects in the environment.

16. The method of claim 11, further comprising comparing, by the processing unit, the visual data to the point cloud of the environment to determine whether to perform one or more further scans.

17. The method of claim 11, further comprising mapping, by the processing unit, the visual data onto the point cloud of the environment.

18. The method of claim 11, wherein a portion of the environment is located below a water line, and wherein the augmenting compensates for a refraction of electromagnetic radiation through water.

19. The method of claim 11, wherein augmenting the portion of the distance data for apportionment of the environment comprises defining a plane of water indicated by the distance data.

20. A non-transitory computer readable storage medium storing instructions that, when executed by a processing unit of a measurement device, cause the processing unit to:

obtain visual data generated by a visual sensor of the measurement device;

obtain distance data generated by a distance sensor of the measurement device;

obtain positional data regarding the measuring device generated by a positional sensor of the measurement device;

combine the positional data and the distance data to generate a point cloud of an environment;

combine the visual data and the distance data to identify objects in the environment;

augment a portion of the distance data for apportionment of the environment; and combine the point cloud and identified objects to create an output schematic.

* * * * *